United States Patent

Kageshima et al.

Patent Number: 6,055,640
Date of Patent: Apr. 25, 2000

[54] POWER ESTIMATION OF A MICROPROCESSOR BASED ON POWER CONSUMPTION OF MEMORY

[75] Inventors: Atsushi Kageshima; Kimiyoshi Usami, both of Tokyo, Japan

[73] Assignee: Kabushiki Kaisha Toshiba, Kawasaki, Japan

[21] Appl. No.: 08/797,783

[22] Filed: Feb. 7, 1997

[30] Foreign Application Priority Data

Feb. 8, 1996 [JP] Japan ................................. 8-022811

[51] Int. Cl.⁷ ...................................................... G06F 1/32
[52] U.S. Cl. ...................... 713/320; 713/300; 713/321; 711/117; 711/118; 711/119
[58] Field of Search .............. 395/750.03, 425, 395/750; 364/200; 711/117, 118, 119, 122

[56] References Cited

U.S. PATENT DOCUMENTS

| | | | |
|---|---|---|---|
| 4,755,935 | 7/1988 | Davis et al. ............................ | 364/200 |
| 4,796,175 | 1/1989 | Matsuo et al. ......................... | 364/200 |
| 4,882,673 | 11/1989 | Witt ....................................... | 364/200 |
| 5,226,138 | 7/1993 | Shermis ................................. | 395/425 |
| 5,359,723 | 10/1994 | Mathews et al. ...................... | 395/425 |
| 5,404,546 | 4/1995 | Stewart .................................. | 395/750 |
| 5,493,667 | 2/1996 | Huck et al. ............................. | 395/452 |
| 5,537,656 | 7/1996 | Mozdzen et al. ...................... | 395/750 |
| 5,579,493 | 11/1996 | Kiuchi et al. .......................... | 395/375 |
| 5,594,884 | 1/1997 | Matoba et al. ......................... | 395/452 |
| 5,666,537 | 9/1997 | Debnath et al. ................... | 395/750.04 |
| 5,758,174 | 5/1998 | Crump et al. ..................... | 395/750.05 |
| 5,781,780 | 7/1998 | Walsh et al. ...................... | 395/750.01 |
| 5,941,991 | 8/1999 | Kageshima ............................ | 713/300 |

*Primary Examiner*—Ayaz R. Sheikh
*Assistant Examiner*—Eric S. Thlang
*Attorney, Agent, or Firm*—Foley & Lardner

[57] ABSTRACT

A power estimator calculates the total power consumption of a microprocessor having a CPU 5, a main memory 1 and a plurality of cache memories 2, 3 and 4 based on an assembler description of a program and calculates power consumption values when an instruction to be executed by the CPU 5 is read from a main memory 1 and when an instruction is read from the cache memories 2, 3 and 4, determines whether the instruction to be executed is read from a memory and then calculates the total power consumption for the microprocessor by using power consumption values for the memories based on the result and the power consumption value obtained for each memory.

10 Claims, 12 Drawing Sheets

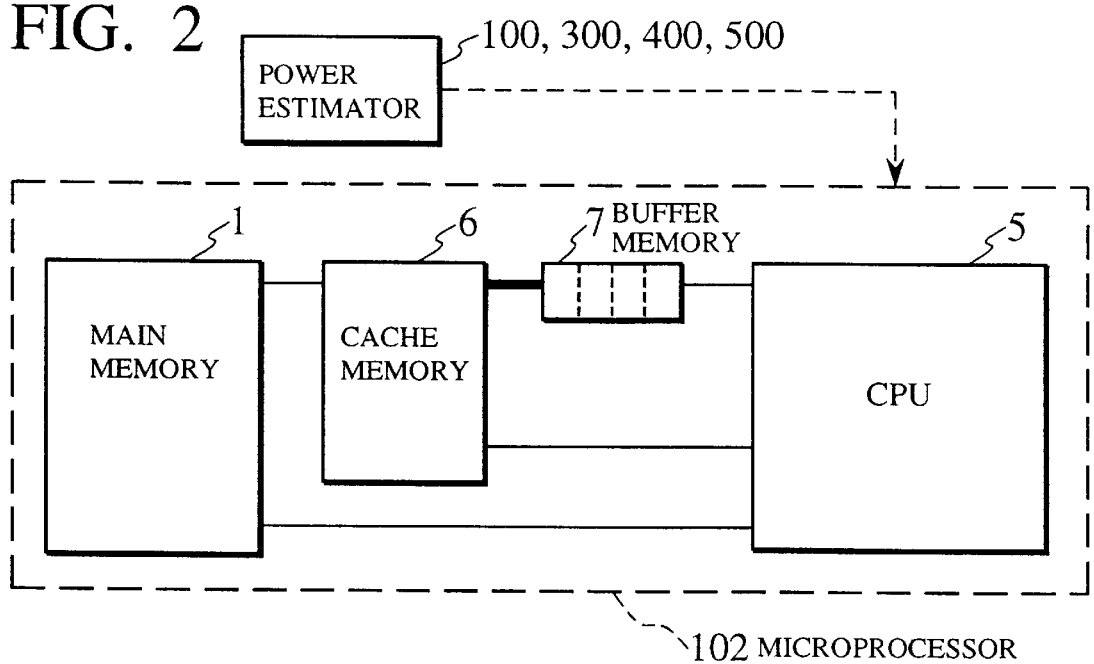
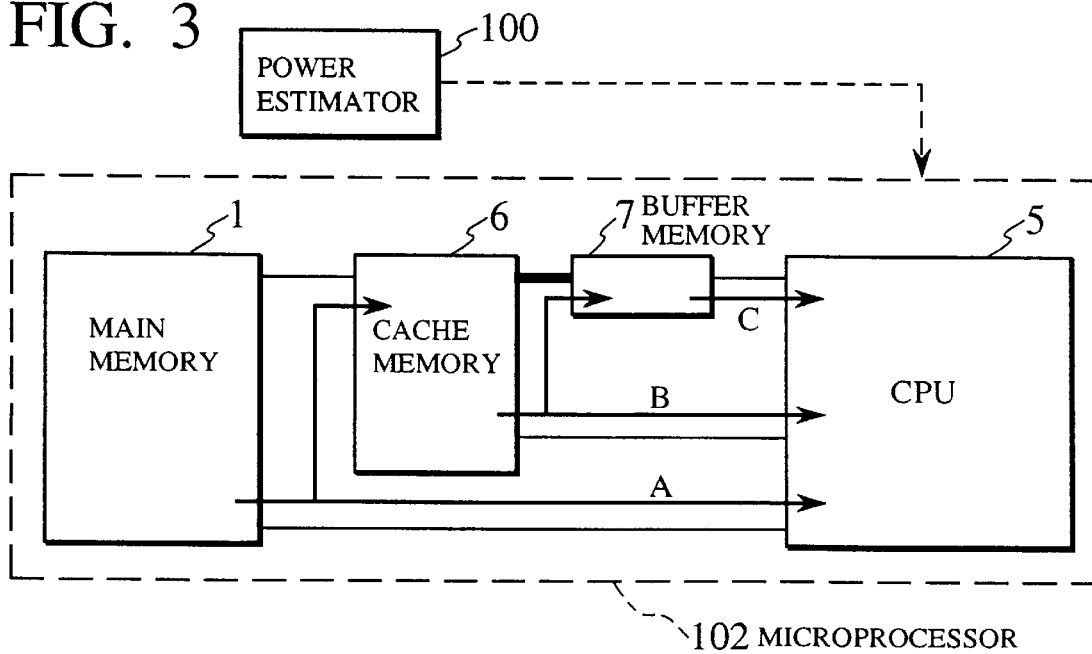

FIG. 4       PROGRAM

```
            load   r10,0
Start:
            add    r10,r10,1
            load   r3,0x04(r1)
            load   r4,0x08(r1)
            load   r5,0x0c(r1)
            add    r6,r3,r4
            add    r7,r6,r5
            store  r7,0x10(r1)
            beq    r10,4,Pass
            j      Start
Pass:
            Halt
```

| load r10,1 | add r10,r10,1 | load r3,0x04(r1) | load r4,0x08(r1) |
|---|---|---|---|
| load r5,0x0c(r1) | add r6,r3,r4 | add r7,r6,r5 | store r7,0x10(r1) |
| beq r10,4,Pass | j Start | | |

```
add    r10,r10,1      ← READ FROM CACHE MEMORY
load   r3,0x04(r1)    ← READ FROM BUFFER MEMORY
load   r4,0x08(r1)    ← READ FROM BUFFER MEMORY
load   r5,0x0c(r1)    ← READ FROM BUFFER MEMORY
add    r6,r3,r4       ← READ FROM CACHE MEMORY
add    r7,r6,r5       ← READ FROM BUFFER MEMORY
store  r7,0x10(r1)    ← READ FROM BUFFER MEMORY
beq    r10,4,Pass     ← READ FROM BUFFER MEMORY
          •
          •
          •
```

FIG. 11

|  | WHEN INSTRUCTIONS ARE READ FROM CACHE MEMORY | WHEN INSTRUCTIONS ARE READ FROM BUFFER MEMORY |
|---|---|---|
| add | 260mW | 120mW |
| load | 230mW | 90mW |
| store | 240mW | 100mW |
| beq | 310mW | 170mW |

FIG. 12

| INSTRUCTION EXECUTION | POWER CONSUMPTION VALUES |
|---|---|
| add | 260mW |
| load | 90mW |
| load | 90mW |
| load | 90mW |
| add | 260mW |
| add | 120mW |
| store | 100mW |
| beq | 170mW |
| SUM | 1180mW |

FIG. 13A

| | POWER CONSUMPTION VALUE OF CPU SECTION 9 |
|---|---|
| add | 100mW |
| load | 70mW |
| store | 80mW |
| beq | 150mW |

FIG. 13B

| | POWER CONSUMPTION VALUE OF MEMORY SECTION 8 |
|---|---|
| WHEN INSTRUCTION IS READ FROM CACHE MEMORY | 160mW |
| WHEN INSTRUCTION IS READ FROM BUFFER MEMORY | 20mW |

FIG. 14

| |
|---|
| CALCULATING POWER CONSUMPTION VALUE OF CPU SECTION 9 WHEN INSTRUCTIONS ARE EXECUTED<br>    ADD 3 TIMES     : 100mW×3=300mW<br>    LOAD 3 TIMES    :  70mW×3=210mW<br>    STORE ONE TIME :  80mW×1=  80mW<br>    BEQ ONE TIME    : 150mW×1=150mW<br><br>CALCULATING POWER CONSUMPTION VALUE OF MEMORY SECTION 8 BASED ON THE NUMBER OF CACHE ACCESSING OPERATIONS<br>    READ FROM CACHE   : 160mW×2=320mW<br>    READ FROM BUFFER :  20mW×6=120mW<br>  SUM : 300+210+80+150+320+120=1180mW |

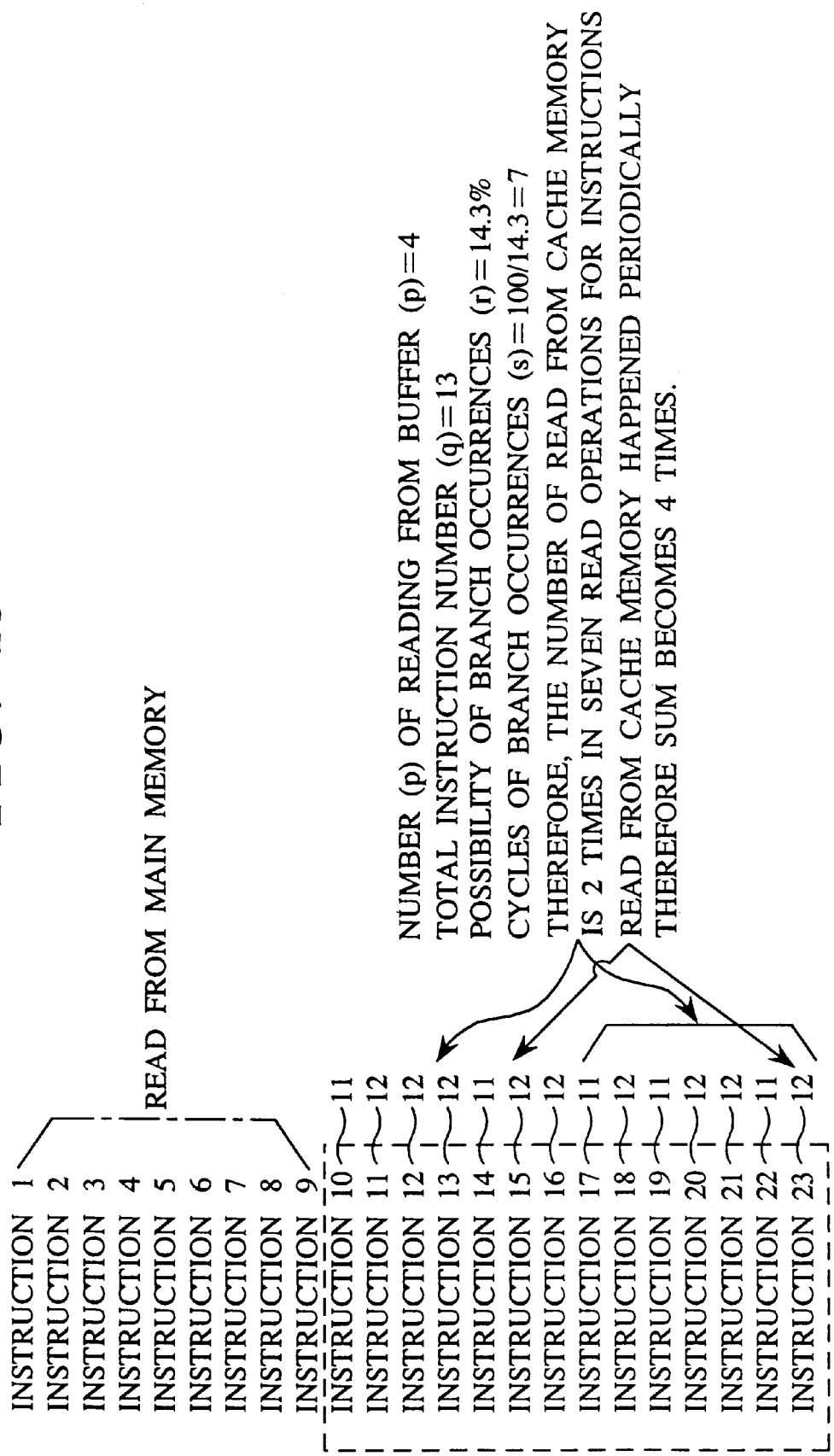

FIG. 16

| 1 | 2 | 3 | 4 |
|---|---|---|---|
| 5 | 6 | 7 | jump3 |
| 8 | 9 | 10 | 11 |

FIG. 17

INSTRUCTION EXECUTION ORDER

| | |
|---|---|
| 1 | ←READ FROM CACHE MEMORY |
| 2 | ←READ FROM BUFFER MEMORY |
| 3 | ←READ FROM BUFFER MEMORY |
| 4 | ←READ FROM BUFFER MEMORY |
| 5 | ←READ FROM CACHE MEMORY |
| 6 | ←READ FROM BUFFER MEMORY |
| 7 | ←READ FROM BUFFER MEMORY |
| jump | ←READ FROM BUFFER MEMORY |
| 3 | ←READ FROM CACHE MEMORY |
| 4 | ←READ FROM BUFFER MEMORY |
| 5 | ←READ FROM BUFFER MEMORY |
| 6 | ←READ FROM BUFFER MEMORY |

FIG. 18

IN CASE THAT READ FROM CACHE MEMORY TO BUFFER MEMORY IS HAPPENED EVERY EXECUTION OF EACH LINE INCLUDING FOUR INSTRUCTIONS STORED IN CACHE MEMORY SHOWN IN FIG.16

INSTRUCTION EXECUTION ORDER

| | |
|---|---|
| 1 | ←READ FROM CACHE MEMORY |
| 2 | ←READ FROM BUFFER MEMORY |
| 3 | ←READ FROM BUFFER MEMORY |
| 4 | ←READ FROM BUFFER MEMORY |
| 5 | ←READ FROM CACHE MEMORY |
| 6 | ←READ FROM BUFFER MEMORY |
| 7 | ←READ FROM BUFFER MEMORY |
| jump | ←READ FROM BUFFER MEMORY |
| 3 | ←READ FROM CACHE MEMORY |
| 4 | ←READ FROM BUFFER MEMORY |
| 5 | ←READ FROM CACHE MEMORY |
| 6 | ←READ FROM BUFFER MEMORY |

FIG. 19 IN CASE THAT INSTRUCTION EXECUTION ORDER IS CHANGED AFTER ONE INSTRUCTION IS EXECUTED AFTER JUMP INSTRUCTION IS EXECUTED

| INSTRUCTION EXECUTION ORDER | |
|---|---|
| 1 | ← READ FROM CACHE MEMORY |
| 2 | ← READ FROM BUFFER MEMORY |
| 3 | ← READ FROM BUFFER MEMORY |
| 4 | ← READ FROM BUFFER MEMORY |
| 5 | ← READ FROM CACHE MEMORY |
| 6 | ← READ FROM BUFFER MEMORY |
| 7 | ← READ FROM BUFFER MEMORY |
| jump | ← READ FROM BUFFER MEMORY |
| 8 | ← READ FROM CACHE MEMORY |
| 3 | ← READ FROM CACHE MEMORY |
| 4 | ← READ FROM BUFFER MEMORY |
| 5 | ← READ FROM BUFFER MEMORY |
| 6 | ← READ FROM BUFFER MEMORY |

FIG. 20 IN CASE THAT READ FROM CACHE MEMORY TO BUFFER MEMORY IS HAPPENED EVERY EXECUTION OF EACH LINE INCLUDING FOUR INSTRUCTIONS STORED IN CACHE MEMORY SHOWN IN FIG.16 AND INSTRUCTION EXECUTION ORDER IS CHANGED AFTER ONE INSTRUCTION IS EXECUTED AFTER JUMP INSTRUCTION IS EXECUTED

| INSTRUCTION EXECUTION ORDER | |
|---|---|
| 1 | ← READ FROM CACHE MEMORY |
| 2 | ← READ FROM BUFFER MEMORY |
| 3 | ← READ FROM BUFFER MEMORY |
| 4 | ← READ FROM BUFFER MEMORY |
| 5 | ← READ FROM CACHE MEMORY |
| 6 | ← READ FROM BUFFER MEMORY |
| 7 | ← READ FROM BUFFER MEMORY |
| jump | ← READ FROM BUFFER MEMORY |
| 8 | ← READ FROM CACHE MEMORY |
| 3 | ← READ FROM CACHE MEMORY |
| 4 | ← READ FROM BUFFER MEMORY |
| 5 | ← READ FROM CACHE MEMORY |
| 6 | ← READ FROM BUFFER MEMORY |

POWER ESTIMATION OF A MICROPROCESSOR BASED ON POWER CONSUMPTION OF MEMORY

BACKGROUND OF THE INVENTION

1. Field of the Invention

The present invention relates to a power estimator for microprocessors having a plurality types of memories such as a main memory, cache memories and the like in order to estimate a power consumption of instructions to be executed by a microcomputer or a microprocessor based on assembler descriptions in a program.

2. Description of the Related Art

Recently, there is a strong trend toward miniaturization, portabilization and mobilization of electronic devices, in particular, personal-computers, by the recently great progress of the computer technology field and of the semiconductor integrated circuit field. In this trend, the power consumption of a microprocessor and the increasing of the processing speed of the microprocessor become very important problems. In order to reduce the power consumption of the microprocessor, it must be required to measure the power consumption of the microprocessor accurately.

For example, the following literature describes the power consumption estimation method for microprocessors including software:

"Power Analysis of Embedded Software: A First Step towards Software Power Minimization", Vivek Tiwari, Sharad Malik, Andrew Wolfe, IEEE-94, PP.384–390, 1994.

The power consumption estimation method disclosed in the above literature is the method to estimate the power consumption based on the types of instructions to be executed actually by a microprocessor. That is, the power consumption of each of instructions to be executed by a microprocessor is measured and stored into a memory in advance. Then, the total power consumption of the microprocessor is measured by applying the power consumption value of each of the instructions, which have been stored in the memory in advance, to instructions to be actually executed in assembler instruction level.

As described above, there is the conventional power consumption estimation method used for microprocessors based on instructions in software programs. However, the conventional power consumption estimation method may estimate no power consumption of microprocessors in consideration for cache memories.

That is, in the conventional power consumption estimation method, it is difficult to estimate the power consumption of microprocessors having cache memories by distinguishing it from the power consumption of microprocessors having no cache memories.

In general, since the power consumptions of cache memories are changed based on their configurations such as the accessing speed and the memory sizes, the power consumption of the microprocessor is changed based on that the instructions are accessed from which type of the cache memory.

However, the conventional power consumption estimation method can not distinguish both the power consumption of a microprocessor including cache memories and the power consumption of a microprocessor including no cache memories. That is, the conventional power consumption estimation method estimates that the power consumption values of both the cases become the same value. Therefore there is the drawback in the conventional power consumption estimation method that it is difficult to estimate the power consumption of microprocessors in instruction level accuracy.

SUMMARY OF THE INVENTION

Accordingly, an object of the present invention is, with due consideration to the drawback of the conventional power consumption estimation method used for microprocessors, to provide a power estimator capable of estimating accurately the power consumption of microprocessors having a plurality types of memories in instruction level.

In accordance with one aspect of the present invention, a power estimator for a microprocessor having a central processing unit (CPU) for calculating a power consumption during instruction execution in the microprocessor based on assembler descriptions of instructions to be executed with a plurality of memories, the power estimator comprises calculation means for calculating a power consumption of each of the plurality of memories when an instruction to be executed by the CPU being read from this memory, distinction means for distinguishing one of the plurality of memories from which the instructions to be executed by the CPU are read, and power consumption calculation means for calculating a total power consumption of the microprocessor by using the power consumptions, obtained by the calculation means, of the instruction, to be executed by the CPU, read from the plurality of memories distinguished by the distinction means.

As another aspect of the present invention, in the power estimator for a microprocessor described above, when the instructions to be executed by the CPU are transferred from a first cache memory forming the plurality of memories to the CPU, and at the same time, when maximum m-instructions (m is a positive integer) counted from the first instruction to be firstly transferred from the first cache memory to the CPU are stored into a second cache memory forming the plurality of memories, an access speed of the second cache memory is higher than the access speed of the first cache memory and a memory size of the second cache memory is smaller than the memory size of the first cache memory, and when the instructions stored in the second cache memory are read and transferred to the CPU until the second cache memory stores no instruction to be executed by the CPU, the power consumption calculation means calculates a first power consumption value when the instructions stored in the first cache memory are transferred directly to the CPU, calculates a second power consumption value when the instructions stored in the second cache memory are transferred to the CPU, and calculates a total power consumption of the microprocessor by using the first power consumption value when every m-th instruction is read to be executed by the CPU and by using the second power consumption value when the instructions other than the m-th instruction are read to be executed by the CPU, after reading operation for the plurality of instructions stored in the plurality of memories are initiated.

As another aspect of the present invention, in the power estimator for a microprocessor described above, when a special instruction such as a branch instruction, a jump instruction and an exceptional instruction is executed by the CPU by which an instruction execution order may be changed, the power consumption calculation means calculates the total power consumption of the microprocessor by using the first power consumption value for every m-th instruction to be executed by the CPU and by using the second power consumption value when the instructions other than the m-th instruction are read to be executed by the CPU, after reading operation for the plurality of instructions stored in the plurality of memories are initiated.

As another aspect of the present invention, in the power estimator for a microprocessor described above, when special instruction such as a branch instruction, a jump instruction and an exceptional instruction is executed by the CPU by which an instruction execution order may be changed, the power consumption calculation means calculates the total power consumption of the microprocessor by using the second power consumption value for the instructions less than the zero-th or m-th instruction to be executed after the execution of the special instruction, and by using the first power consumption value for every m-th instruction to be executed after the execution of the instructions less than the zero-th or m-th instruction, and by using the second power consumption value for other instructions.

As another aspect of the present invention, in the power estimator for a microprocessor described above, when a special instruction such as a branch instruction, a jump instruction and an exceptional instruction is executed by the CPU by which an instruction execution order may be changed and when the instruction execution order of the instructions is changed after one or a plurality of instructions are executed, the power consumption calculation means calculates the total power consumption of the microprocessor by using the first power consumption value for every m-th instruction after the execution of the plurality of instructions are performed after the execution of the special instruction, and by using the second power consumption value for other instructions other than every m-th instruction.

As another aspect of the present invention, in the power estimator for a microprocessor described above, when a special instruction such as a branch instruction, a jump instruction and an exceptional instruction is executed by the CPU by which an instruction execution order may be changed, and when the instruction execution order of the instructions is changed after one or a plurality of instructions are executed, the power consumption calculation means calculates the total power consumption of the microprocessor by using the second power consumption value for the instructions less than the zero-th or m-th instruction to be executed after the execution of the following instruction after the execution of the plurality of instructions are performed after the execution of the special instruction, and by using the first power consumption value for every m-th instruction to be executed after the execution of the instructions less than the zero-th or m-th instruction, and by using the second power consumption value for other instructions.

As another aspect of the present invention, in the power estimator for a microprocessor described above, the power consumption calculation means calculates the total power consumption of the microprocessor by calculating the number of the instructions to be read and transferred from each of the plurality of memories, and by multiplying the number of the instructions to be read for each of the plurality of memories with the power consumption value obtained for each of the plurality of memories, and by calculating a sum of the multiplied results obtained for the plurality of memories, based on the number of the special instructions such as a branch instruction, a jump instruction and an exceptional instruction executed by the CPU by which an instruction execution order may be changed and a memory size of each of the plurality of memories.

As another aspect of the present invention, in the power estimator for a microprocessor described above, the power consumption calculation means calculates the total power consumption of the microprocessor by calculating the number of the instructions to be read and transferred from each of the plurality of memories, and by multiplying the number of the instructions to be read for each of the plurality of memories with the power consumption value obtained for each of the plurality of memories, and by calculating a sum of the multiplied results obtained for the plurality of memories, based on a possibility of an occurrence of execution of a special instruction such as a branch instruction, a jump instruction and an exceptional instruction executed by the CPU by which an instruction execution order may be changed and a memory size of each of the plurality of memories.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 2 is a diagram showing the configuration of the power estimator of the first embodiment according to the present invention and another configuration of a microprocessor whose power consumption will be estimated by the power estimator;

FIG. 3 is a diagram showing instruction flows to be read from memories in a target microprocessor to be estimated shown in FIG. 2;

FIG. 4 is a diagram showing an example of instructions in a program to be estimated by the power estimator as the second embodiment according to the present invention;

FIG. 11 is a diagram showing an example of basic power consumption values estimated by a conventional power estimator;

FIG. 12 is a diagram showing an example of a power consumption of the instructions shown in FIG. 8 obtained by the conventional power estimator by using the basic power consumption values shown in FIG. 11;

FIGS. 13A and 13B are diagrams showing an example of basic power consumption values obtained by the power estimator of the sixth embodiment;

FIG. 14 is a diagram showing an example of the power consumption of the instructions shown in FIG. 8 by using the basic power consumption values shown in FIGS. 13A and 13B;

FIG. 15 is a diagram showing an example of instructions to be executed;

FIG. 16 is a diagram showing a state in which instructions are stored in a cache memory;

FIG. 17 is a diagram showing an instruction execution order and based on this order instructions are executed sequentially by a microprocessor to be estimated by the power estimator of the second embodiment according to the present invention;

FIG. 18 is a diagram showing an instruction execution order and based on this order instructions are executed in order by a microprocessor to be estimated by the power estimator of the third embodiment according to the present invention;

FIG. 19 is a diagram showing an instruction execution order and based on this order instructions are executed in order by a microprocessor to be estimated by the power estimator of the fourth embodiment according to the present invention; and FIG. 20 is a diagram showing an instruction execution order, based on this order, instructions are executed in order by a microprocessor to be estimated by the power estimator of the fifth embodiment according to the present invention.

DESCRIPTION OF THE PREFERRED EMBODIMENTS

Other features of this invention will become apparent through the following description of preferred embodiments which are given for illustration of the invention and are not intended to be limiting thereof.

Preferred embodiments of the power estimator for estimating power consumptions of microprocessors or microcomputers according to the present invention will now be described with reference to the drawings.

First Embodiment

Figure 1:
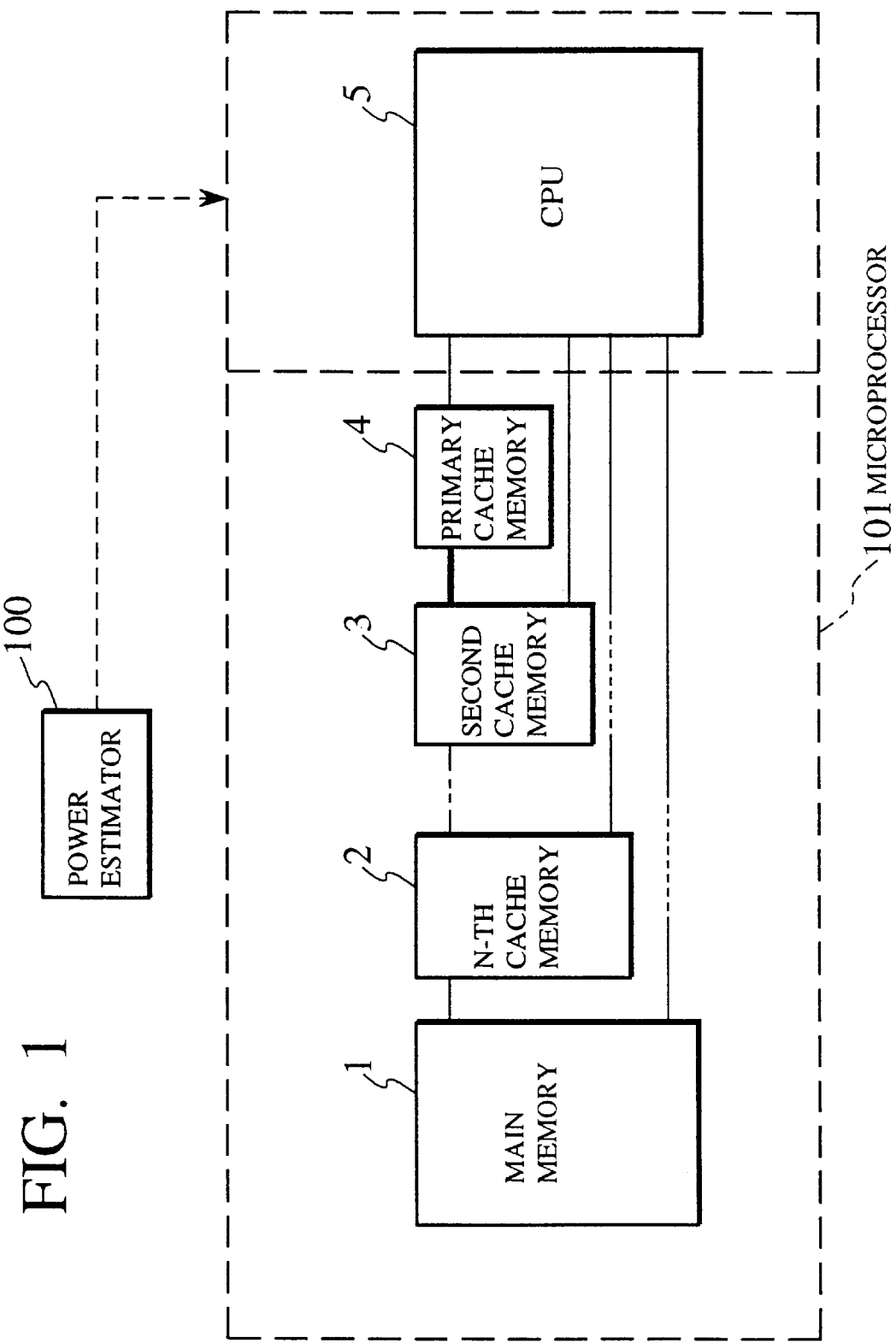
FIG. 1 is a diagram showing the configuration of the power estimator of the first embodiment according to the present invention and the configuration of a microprocessor whose power consumption will be estimated by the power estimator.

FIG. 1 is a diagram showing the configuration of the power estimator 100 as the first embodiment according to the present invention and the configuration of a microprocessor or a microcomputer 101 whose power consumption will be estimated by the power estimator 100. The power estimator 100 of the first embodiment according to the present invention estimates the power consumption of the microprocessor 101 when instructions are executed. The microprocessor 101 comprises a central processing unit (CPU) 5 and a plurality of memories 1, 2, 3 and 4 in which the instructions to be executed by the CPU are stored. The power estimator 100 of the first embodiment comprises a means for estimating a power consumption of each memory from which instructions to be executed by the CPU are read out, a judging means for judging one of the plurality of memories 1, 2, 3 and 4 from which an instruction to be executed by the CPU 5 is read out, and a calculating means for calculating the power consumption of the instruction to be executed by the CPU 5 by comparing the memory indicated by the judging means with a power consumption value for each instruction which has been measured and stored in a memory, for example. The power estimator 100 according to the present invention can be used as an evaluation tool for microprocessors having a plurality types of memories. The plurality types of memories incorporated in the microprocessor are main memory, cache memories, buffer memories, instruction queue and the like, for example.

In order to easily understand the operation of the power estimation performed by the power estimator 100 according to the first embodiment shown in FIG. 1, we assume here that the microprocessor 101 shown in FIG. 1 has a simple configuration in which two cache memories such as the cache memory 6 and the buffer 7 whose accessing speed is higher than that of the cache memory 6 and the number of instructions stored in the buffer 7 is four, as shown in FIG. 2, namely, FIG. 2 is the diagram showing the configuration of the power estimator 100 of the first embodiment according to the present invention and another configuration of the microprocessor 102 whose power consumption will be estimated by the power estimator 100.

The function and the operation of the power estimator 100 of the first embodiment are as follows:

Until instructions to be executed by the CPU 5 are read from the cache memory 6 as the first cache memory, at the same time, the maximum four instructions including the instruction which has already been read from the cache memory 6 into the CPU 5 are stored into the buffer 7 as the second cache memory and until the executions of all of the instructions stored in the buffer 7 are completed, First, the power estimator 100 calculates a first power consumption value when instructions to be executed by the CPU 5 are read from the cache memory 6;

Second, the power estimator 100 calculates a second power consumption value of instructions to be executed by the CPU 5 are read from the buffer 7; and Finally, the power estimator 100 calculates the total power consumption of the microprocessor 102 by using the first power consumption value when every fourth instruction is read after instruction readout operation is initiated and by using the second power consumption value when instructions other than the fourth order instruction are executed.

In the microprocessor 102 having the configuration shown in FIG. 2, the power consumption value of each of routes A, B and C is calculated in advance by the power estimator 100 of the first embodiment. FIG. 3 is a diagram showing instruction routes A, B and C through which instructions to be executed by the CPU 5 are transferred from the memories 1, 6 and 7 to the CPU 5 in the microprocessor 102 shown in FIG. 2. In the instruction route A, the instruction to be executed by the CPU 5 is read from the main memory 1 to the CPU 5. In the instruction route B, the instruction to be executed by the CPU 5 is read from the cache memory 6 to the CPU 5. In the instruction route C, the instruction to be executed by the CPU 5 is read from the buffer memory 7 to the CPU 5. The power estimator 100 of the first embodiment reads each of the power consumption values corresponding to the routes A, B and C, then judges the instruction flow route through which the instruction to be executed by the CPU 5 is transferred to the CPU 5, and calculates the power consumption of the instruction to be executed by using the power consumption values based on the judged instruction route.

Second Embodiment

Next, the function of the power estimator 200 for estimating the power consumption of microprocessors according to the second embodiment will be explained.

The power estimator 200 of the second embodiment has the function, in addition to the function of the power estimator 100 of the first embodiment, that the first power consumption value is used when every fourth instruction execution is executed and the second power consumption value is used when other instructions are executed after special instructions such as a branch instruction, a jump instruction, an exception processing and the like by which an instruction flow is changed, are executed.

FIG. 4 is a diagram showing an example of instructions in a program to be estimated by the power estimator 200 as the second embodiment according to the present invention.

Figures 5, 6:
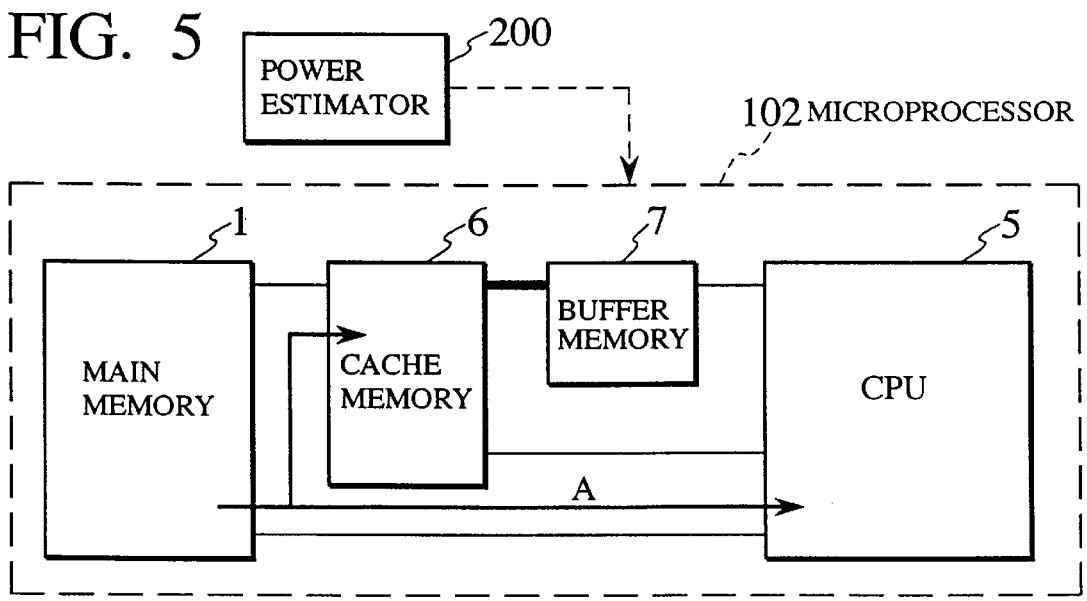
FIG. 5 is a diagram showing instruction flows in a microprocessor to be estimated by the power estimator according to the second embodiment.
FIG. 6 is a diagram showing the state of instructions stored in a cache memory in the microprocessor to be estimated by the power estimator of the second embodiment.

In the operation of the target microprocessor 102 to be estimated, for example, when the instructions are executed as shown in FIG. 4, the instructions are read and transferred from the main memory 1 to both the cache memory 6 and the CPU 5 and then the instructions are executed by the CPU 5 at the same time during the first loop, as shown in FIG. 5. In this case, the state of the instructions stored in the cache memory 6 is shown in FIG. 6.

Figures 7, 8:
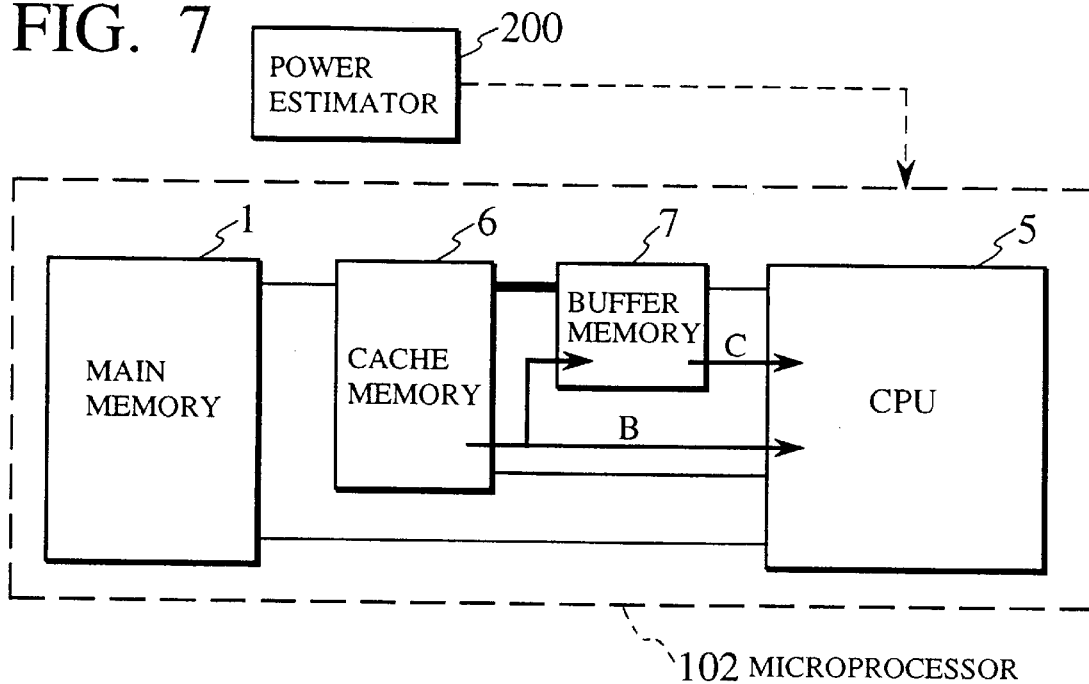
FIG. 7 is a diagram showing other instruction flows in a microprocessor to be estimated by the power estimator according to the second embodiment.
FIG. 8 is a diagram showing devices from which instructions are read when the instructions are executed.

Next, when the instructions in the same instruction group are executed again by a jump instruction, these instructions are read from the cache memory 6, not from the main memory 1. At this time, four instructions are stored into the buffer 7 at one time (see route B) in order to increase the operation speed of the microprocessor 102, as shown in FIG. 7. After this operation, each instruction is read and transferred to the CPU 5 until the buffer 7 has no instruction (see route C).

At this time, when the instruction to be executed flows through the route B, the power consumption is increased because the power consumption of the cache memory 6 is greater than that of the main memory 1 and the buffer 7. When the instruction to be executed flows through the route C, the power consumption is decreased because the power consumption of the buffer memory 7 is smaller than that of the cache memory 6. Thus, in order to estimate the power consumption of the instructions stored in the cache memory 6 accurately, the power consumption of the instruction from the cache memory 6 and the power consumption of the instruction from the buffer memory 7 are measured in advance, for example stored into a memory in the power estimator 200 of the second embodiment. Then, as shown in FIG. 8, when the number of instructions to be stored from the cache memory 6 into the buffer 7 is "m" (the "m" is a positive integer and the number "m" is four in this second embodiment.) at one time, the power estimator 200 of the second embodiment uses the power consumption value measured for the cache memory 6 when the "m"-th instruction is transferred or accessed and uses the power consumption value used for the buffer memory 7 when the instructions other than the "m"-th instruction are accessed or transferred.

On the other hand, during the instruction execution processes described above, there is a case in which other instructions which are not stored in the buffer 7 are executed based on the execution of special instructions such as a jump instruction, a branch instruction, and an exception instruction by which the instruction execution order is changed.

Figure 9:
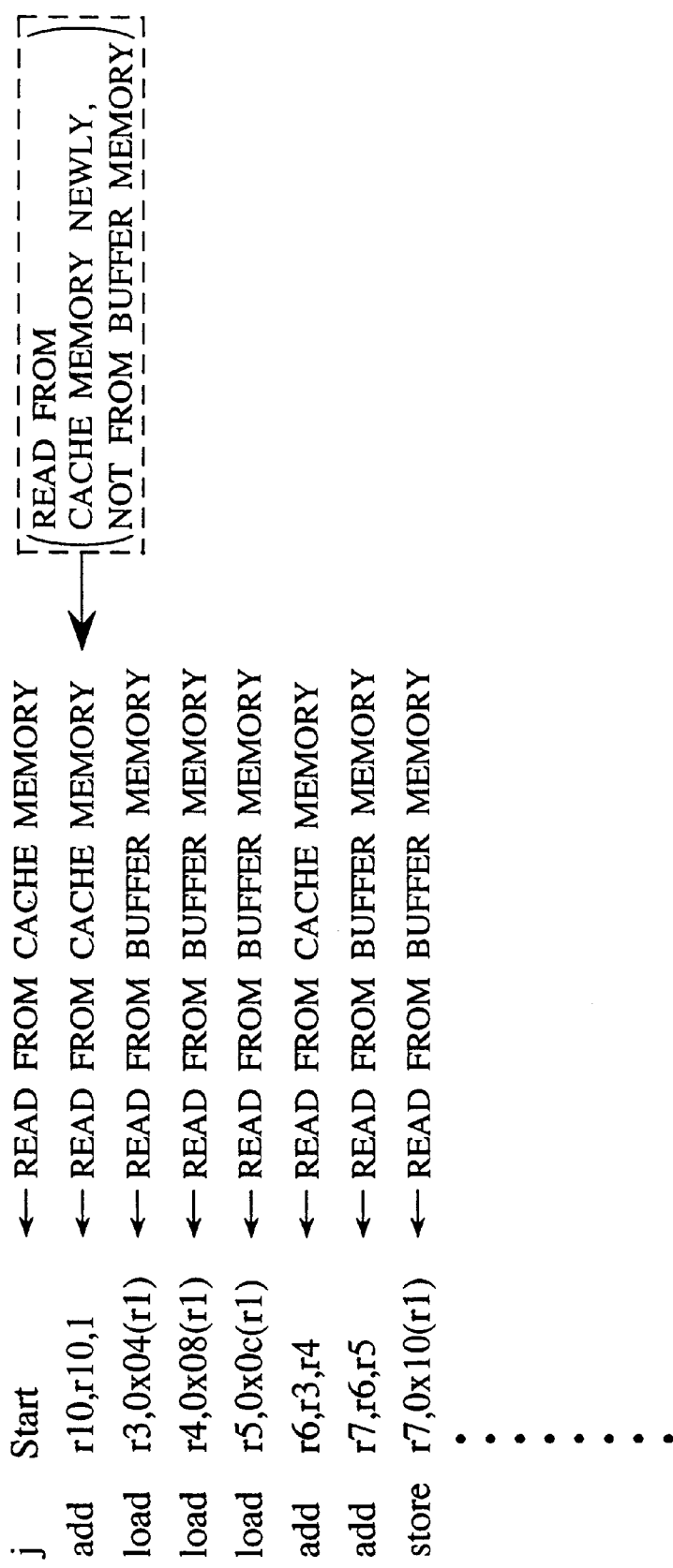
FIG. 9 is a diagram showing devices from which instructions are read when instructions are executed after the execution of a jump instruction is finished.

FIG. 9 is a diagram showing devices from which instructions are read when instructions are executed after the execution of a jump instruction is completed.

For example, FIG. 9 shows the instruction flow after the instructions in the instruction group shown in FIG. 4 are executed according to the instruction flow shown in FIG. 8. As shown in FIG. 9, the instructions which are not stored in the buffer 7 are executed based on the execution of the jump instruction. In this case, the power estimator 200 of the second embodiment calculates the power consumption based on the case where an instruction is read from the cache memory 6 every "m"-th instruction. Thus, the power consumption obtained by using the instruction route through which an instruction is read from the cache memory 6 is used for the following instruction executed immediately after the execution of each of special instructions such as a jump instruction, a branch instruction, an exception instruction and the like is performed. Then, the power consumption of an instruction as every "m"-th instruction will be calculated by using the instruction route passing through the cache memory 6 and the power consumption of an instruction other than this instruction is calculated based on the route passing through the buffer memory 7.

Third Embodiment

Next, the function of the power estimator 300 for estimating the power consumption of microprocessors according to the third embodiment will be explained.

The feature of the power estimator 300 of the third embodiment is as follows:

In the case that during the power consumption of the microprocessor 102 shown in FIG. 2 is calculated by the power estimator 300 of the fourth embodiment, the power consumption of the 0-th instruction in instruction execution order or the instruction that is less than the "m"-th instruction in execution order is calculated based on the power consumption value (the second power consumption value) used for the buffer memory 7, immediately after the special instructions such as a jump instruction, a branch instruction, an exception instruction by which the instruction execution order is changed are executed. Then, the power consumption of an instruction of every m-th order in instruction execution order is calculated by using the power consumption value (the second power consumption value) used for the cache memory 6 and the power consumption of an instruction other than this m-th order instruction is calculated by using the second power consumption value.

FIG. 16 is a diagram showing a state in which instructions are stored in the cache memory 6. FIG. 17 is a diagram showing an instruction execution order, based on this order, instructions are executed in order by a microprocessor 102 to be estimated by the power estimator 200 of the second embodiment according to the present invention. FIG. 18 is a diagram showing an instruction execution order, based on this order, instructions are executed in order by the microprocessor 102 to be estimated by the power estimator 300 of the third embodiment according to the present invention.

For example, as shown in FIG. 16 (where each numerical number designates an instruction to be executed, for example, "jump 3" indicates a jump instruction to jump the instruction 3), the operation flow of the power estimator 200 of the second embodiment traces the execution route shown in FIG. 17 when an instruction stored in the cache memory 6 is executed. On the contrary, the operation flow of the power estimator 300 of the third embodiment is as follows:

The following instruction to be executed after execution of the jump 3 instruction is read from the cache memory 6. Then, the following instruction (instruction 4) is read from the buffer memory 7 and the following every 4-th (m=4) instruction after this is read from the cache memory 6. This means that instructions (the number "m" is 4 in this third embodiment), are transferred from the cache memory 6 to the buffer memory 7 every one memory field (or every one line) in the cache memory 6. Thus, the power estimator 300 of the third embodiment can calculate accurately the power consumption of the microprocessor performing the operation described above.

Fourth Embodiment

Next, the function of the power estimator 400 for estimating the power consumption of microprocessors according to the fourth embodiment will be explained.

The feature of the power estimator 400 of the fourth embodiment is as follows:

In the case that during the power consumption of the microprocessor 102 shown in FIG. 2 is calculated by the power estimator 400 of the fourth embodiment, when the instruction execution order is changed immediately after one instruction or a several number of instructions are executed and after the special instructions such as a jump instruction, a branch instruction, an exception instruction by which the instruction execution order is changed are executed, the power consumption of an instruction of every m-th instruction execution order is calculated by using the power consumption value (the second power consumption value) for the cache memory 6 and the power consumption of an instruction other than this m-th instruction is calculated by using the power consumption value (the second power consumption value) used for the buffer memory 7.

FIG. 19 is a diagram showing an instruction execution order, based on this order, instructions are executed in order by the microprocessor 102 to be estimated by the power estimator 400 of the fourth embodiment according to the present invention. For example, the power estimator 400 of the fourth embodiment can estimate accurately the power consumption of the microprocessor in which every fourth order ("m" is four in this embodiment) instruction is read from the cache memory 6 after one instruction is executed after the jump 3 instruction shown in FIG. 19 is executed when the instructions stored in the cache memory 6 shown in FIG. 16 are executed.

Fifth Embodiment

Next, the function of the power estimator 500 for estimating the power consumption of microprocessors according to the fifth embodiment will be explained.

The power estimator 500 of the fifth embodiment has the function which is the combination of the function of the power estimator 300 of the third embodiment and the function of the power estimator 400 of the fourth embodiment described above.

FIG. 20 is a diagram showing an instruction execution order in a microprocessor to be estimated by the power estimator 500 of the fifth embodiment. Based on this instruction order shown in FIG. 20, instructions are executed by the microprocessor. That is, FIG. 20 shows the instruction execution order in which an instruction is read or transferred from the cache memory 6 to the buffer memory 7 per instruction execution line shown in FIG. 16 and an instruction is read every "m"-th instruction from the cache memory 6 to the buffer memory 7 after the following instruction of a jump instruction is executed after this jump instruction is executed.

Because the function of the power estimators 300 and 400 have already been described above in detail, these explanation is omitted here for brevity. When the microprocessor whose power consumption will be estimated by the power estimator 500 of the fifth embodiment executes the instructions shown in FIG. 16, the microprocessor executes these instructions based on the instruction execution order shown in FIG. 20. In FIG. 20, Thereby, the power estimator 500 of the fifth embodiment can estimate accurately the power consumption of the microprocessor.

Sixth Embodiment

Next, the function of the power estimator 600 for estimating the power consumption of microprocessors according to the sixth embodiment will be explained.

The function of the power estimator 600 of the sixth embodiment is as follows:

The power estimator 600 of the sixth embodiment can estimate the power consumption of the microprocessor 200 calculates the access number to instructions to be read from each memory, then multiplies the access number for each memory by the power consumption of each memory, and then adds the multiplied value of each memory to obtain the total power consumption of the microprocessor, based on the number of instructions to be executed by the CPU 5, the number of the special instructions such as a jump instruction, a branch instruction, an exception instruction by which the instruction execution order is changed, and the sizes of the memories such as the main memory 6 and the cache memory, the buffer memory 7.

Figure 10:
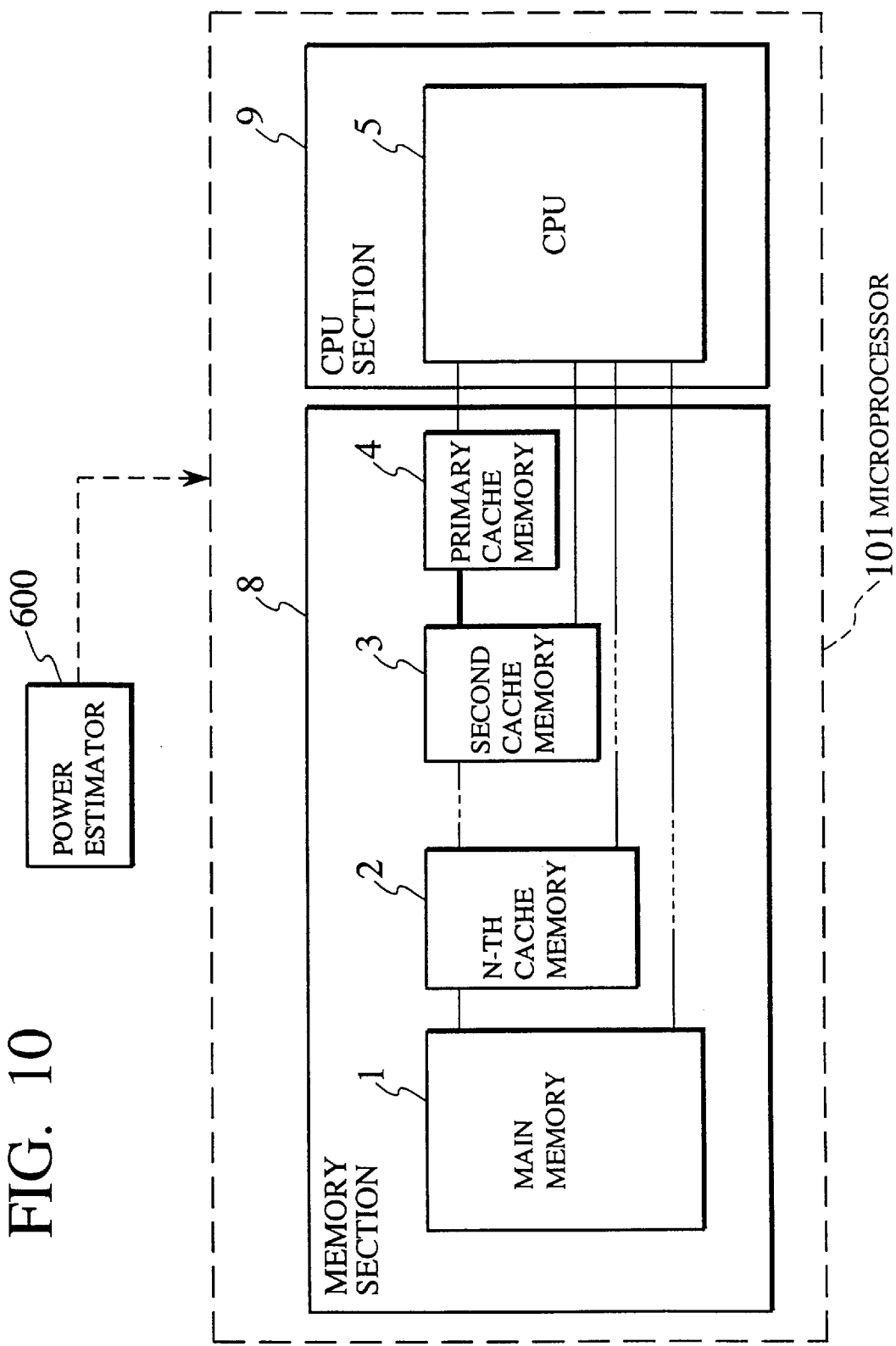
FIG. 10 is a diagram showing a memory section and a central processing unit (CPU) section in a microprocessor to be estimated by the power estimator of the sixth embodiment according to the present invention.

FIG. 10 is a diagram showing the memory section 8 and the central processing unit (CPU) section 9 in the microprocessor 101 to be estimated by the power estimator 600 of the sixth embodiment according to the present invention. For example, as shown in FIG. 10, the total power consumption of the microprocessor 101 can be obtained by adding the power consumption of the memory section 8 and the CPU section 9. That is, this can be expressed by the following equation:

(Power consumption value during an instruction execution)(X)= (power consumption value of the CPU section 9)(Y)+(power consumption value of memory section 8)(Z), where (X), (Y), (Z) designate power consumption and (Y) and (Z) can be calculated independently.

FIG. 11 is a diagram showing an example of basic power consumption values estimated by a conventional power estimator, and FIG. 12 is a diagram showing an example of a power consumption of the instructions shown in FIG. 8 obtained by the conventional power estimator by using the basic power consumption values shown in FIG. 11. On the other hand, FIGS. 13A and 13B are diagrams showing an example of basic power consumption values used in the power estimator 600 of the sixth embodiment and FIG. 14 is a diagram showing an example of the power consumption of the instructions shown in FIG. 8 by using the basic power consumption values shown in FIGS. 13A and 13B.

For example, in order to calculate the power consumption value of each instruction shown in FIG. 8, it must be performed to calculate a basic power consumption value shown in FIG. 11 when the conventional power estimator is used where the power consumption of each of the memory section 8 and the CPU section 9 are not calculated independently or separately. In this case, the calculation result of the power consumption of the microprocessor performing the instructions shown in FIG. 8 becomes the values shown in FIG. 12 by using the relationship of the power consumption values shown in FIG. 11.

On the contrary, when the power consumption value of each of the memory section 8 and the CPU section 9 is calculated independently by the power estimator 600 of the sixth embodiment, only the power consumption values shown in FIGS. 13A and 13B can be used to calculate the power consumption of the microprocessor. When those power consumption values shown in FIGS. 13A and 13B are used, the total power consumption of the microprocessor shown in FIG. 14 can be calculated. It is apparent that the value shown in FIG. 14 is equal to the value shown in FIG. 12.

Thereby, the power estimator 600 of the sixth embodiment calculates the power consumption of the microprocessor only by using (a+b) basic power consumption values, not by using the (a×b) basic power consumption values like the conventional power estimator. The power estimator 600 of the sixth embodiment according to the present invention make it possible to reduce the pattern numbers of the basic power consumption values which are calculated and stored in a memory in advance.

Seventh Embodiment

Next, the function of the power estimator 700 for estimating the power consumption of microprocessors according to the seventh embodiment will be explained.

The function of the power estimator 700 of the sixth embodiment is as follows:

The power estimator 700 of the seventh embodiment can estimate the power consumption of the microprocessor 200 calculates the access number to instructions to be read from each memory, then multiplies the access number for each memory by the power consumption of each memory, and then adds the multiplied value of each memory to obtain the total power consumption of the microprocessor, based on the number of instructions to be executed by the CPU 5, the probabilities of the executions of the special instructions such as a jump instruction, a branch instruction, an exception instruction by which the instruction execution order is changed, and the sizes of the memories such as the main memory 6 and the cache memory, the buffer memory 7.

The power estimator 700 of the seventh embodiment can estimates the power consumption of the microprocessor by using the probability of numbers of read operations from the cache memory 6 which are caused irregularly based on external conditions.

For example, when the microprocessor 102 shown in FIG. 2 executes the 23-instructions based on the instructions described in a program whose number is 10, the number of readings from the main memory 6 is 9 and when the probability of the branch instructions in the remaining 14-instructions is 14.3 percentage, it can be assumed to happen irregularly the reading operation from the cache memory 6 per (100/4.3)=about 7 times.

FIG. 15 is a diagram showing an example of instructions to be executed. Therefore, as shown in FIG. 15, because the total number of instructions to be executed is 23, when the instruction group consisting of the 23 instructions is executed, it can be assumed to access the cache memory 6 four times (=2×2) and the number of instruction read from the cache memory 6 is 11 and the number of instructions read from the buffer memory 7 is 12.

In a case that the state described above is applied to the microprocessor comprising the main memory 1, the first cache memory 2, the second cache memory 3, the buffer memory 7 and the CPU 5 in which "p" instructions ("p" is a positive integer) are read from the cache memory 6 to the buffer 7, when the total number of instructions described in a program is "t" ("t" is a positive integer), the total number of the instructions to be executed is "q" ("q" is a positive number), and when the probability of the execution of the special instructions such as the branch instructions and the like is "or" percentage ("r" is a positive integer), the read cycle s from the cache memory caused irregularly becomes "s"=(100/r). This means that the read operation from the cache memory will be happen per ([s/p]+1) time where s is the number of instructions. This cycle becomes (q−t)/s times based on the total instruction numbers (q−t).

Therefore the value [(q−t)/s]×([s/p]+1) can be applied to the estimation of the power consumption of other microprocessor, where the value enclosed by the character "[ ]" means the value whose decimal is omitted. For example, ([5/2]+[7/4])=2+1=3.

In an example of a microprocessor, the power consumption value of the execution of an add instruction becomes 560 mW when the add instruction is read from a cache memory and executed, it becomes 404 mW when from the buffer memory 7. These two cases causes approximately 40 percentage difference in power consumption. By compensating this difference, the accuracy of the power consumption estimation for microprocessors performed by the power estimator 700 of the seventh embodiment can be increased.

As described above in detail, according to the power estimator of the present invention, because the power consumption of a microprocessor is calculated by using the power consumption value per memory from which instructions are read out, it can be achieved to increase the accuracy of the estimation of the power consumption of a microprocessor having a plurality types of memories.

While the above provides a full and complete disclosure of the preferred embodiments of the present invention, various modifications, alternate constructions and equivalents may be employed without departing from the true spirit and scope of the invention. Therefore the above description and illustration should not be construed as limiting the scope of the invention, which is defined by the appended claims.

What is claimed is:

1. A power estimator for a microprocessor having a central processing unit (CPU) and a plurality of memories for calculating a power consumption during instruction execution in the microprocessor based on assembler descriptions of instructions to be executed, the power estimator comprising:

calculation means for calculating a power consumption of each of the plurality of memories when one of the instructions to be executed by the CPU is read from the plurality of memories;

distinction means for distinguishing one of the plurality of memories from which the one of the instructions to be executed by the CPU is read; and power consumption calculation means for calculating a total power consumption of the microprocessor by using the power consumptions, obtained by the calculation means, of the one of the instructions, to be executed by the CPU, read from the plurality of memories distinguished by the distinction means.

2. A power estimator for a microprocessor as claimed in claim 1, wherein when the instructions to be executed by the CPU are transferred from a first cache memory forming one of the plurality of memories to the CPU, and at a same time, when n instructions, n<m, where m and n is a positive integer and m is the memory size of a second cache memory, counted from the first instruction to be firstly transferred from the first cache memory to the CPU are stored into said second cache memory forming another of the plurality of memories, an access speed of the second cache memory is higher than the access speed of the first cache memory and a memory size of the second cache memory is smaller than the memory size of the first cache memory, and when the instructions stored in the second cache memory are read and transferred to the CPU until the second cache memory stores no instruction to be executed by the CPU, the power consumption calculation means calculates a first power consumption value when the instructions stored in the first cache memory are transferred directly to the CPU, calculates a second power consumption value when the instructions stored in the second cache memory are transferred to the CPU, and calculates a total power consumption of the microprocessor by using the first power consumption value when every m-th instruction is read to be executed by the CPU and by using the second power consumption value when the instructions other than the m-th instruction are read to be executed by the CPU, after reading operations for the plurality of instructions stored in the plurality of memories are initiated.

3. A power estimator for a microprocessor as claimed in claim 2, wherein when a branch instruction, a jump instruction or an exceptional instruction is executed by the CPU by which an instruction execution order may be changed, the power consumption calculation means calculates the total power consumption of the microprocessor by using the first power consumption value for every m-th instruction to be executed by the CPU and by using the second power consumption value when the instructions other than the m-th instruction are read to be executed by the CPU, after reading operation for the plurality of instructions stored in the plurality of memories are initiated.

4. A power estimator for a microprocessor as claimed in claim 2, wherein when a branch instruction, a jump instruction or an exceptional instruction is executed by the CPU by which an instruction execution order may be changed, the power consumption calculation means calculates the total power consumption of the microprocessor by using the second power consumption value for the instructions less than the zero-th or m-th instruction to be executed after the execution of the special instruction, and by using the first power consumption value for every m-th instruction to be executed after the execution of the instructions less than the zero-th or m-th instruction, and by using the second power consumption value for other instructions.

5. A power estimator for a microprocessor as claimed in claim 2, wherein when a special instruction such as a branch instruction, a jump instruction and an exceptional instruction is executed by the CPU by which an instruction execution order may be changed and when the instruction execution order of the instructions is changed after one or a plurality of instructions are executed, the power consumption calculation means calculates the total power consumption of the microprocessor by using the first power consumption value for every m-th instruction after the execution of the plurality of instructions are performed after the execution of the special instruction, and by using the second power consumption value for other instructions other than every m-th instruction.

6. A power estimator for a microprocessor as claimed in claim 2, wherein when a special instruction such as a branch instruction, a jump instruction and an exceptional instruction is executed by the CPU by which an instruction execution order may be changed, and when the instruction execution order of the instructions is changed after one or a plurality of instructions are executed, the power consumption calculation means calculates the total power consumption of the microprocessor by using the second power consumption value for the instructions less than the zero-th or m-th instruction to be executed after the execution of the following instruction after the execution of the plurality of instructions are performed after the execution of the special instruction, and by using the first power consumption value for every m-th instruction to be executed after the execution of the instructions less than the zero-th or m-th instruction, and by using the second power consumption value for other instructions.

7. A power estimator for a microprocessor as claimed in claim 1, wherein the power consumption calculation means calculates the total power consumption of a microprocessor by calculating the number of the instructions to be read and transferred from each of the plurality of memories, and by multiplying the number of the instructions to be read for each of the plurality of memories with the power consumption value obtained for each of the plurality of memories, and by calculating a sum of the multiplied results obtained for the plurality of memories, based on the number of the special instructions such as a branch instruction, a jump instruction and an exceptional instruction executed by the CPU by which an instruction execution order may be changed and a memory size of each of the plurality of memories.

8. A power estimator for a microprocessor as claimed in claim 2, wherein the power consumption calculation means calculates the total power consumption of the microprocessor by calculating the number of the instructions to be read and transferred from each of the plurality of memories, and by multiplying the number of the instructions to be read for each of the plurality of memories with the power consumption value obtained for each of the plurality of memories, and by calculating a sum of the multiplied results obtained for the plurality of memories, based on the number of the special instructions such as a branch instruction, a jump instruction and an exceptional instruction executed by the CPU by which an instruction execution order may be changed and a memory size of each of the plurality of memories.

9. A power estimator for a microprocessor as claimed in claim 1, wherein the power consumption calculation means calculates the total power consumption of the microprocessor by calculating the number of the instructions to be read and transferred from each of the plurality of memories, and by multiplying the number of the instructions to be read for each of the plurality of memories with the power consumption value obtained for each of the plurality of memories, and by calculating a sum of the multiplied results obtained for the plurality of memories, based on an occurrence of execution of a branch instruction, a jump instruction or an exceptional instruction executed by the CPU by which an instruction execution order may be changed and a memory size of each of the plurality of memories.

10. A power estimator for a microprocessor as claimed in claim 2, wherein the power consumption calculation means calculates the total power consumption of the microprocessor by calculating the number of the instructions to be read and transferred from each of the plurality of memories, and by multiplying the number of the instructions to be read for each of the plurality of memories with the power consumption value obtained for each of the plurality of memories, and by calculating a sum of the multiplied results obtained for the plurality of memories, based on a possibility of an occurrence of execution of a special instruction such as a branch instruction, a jump instruction and an exceptional instruction executed by the CPU by which an instruction execution order may be changed and a memory size of each of the plurality of memories.

* * * * *